(12) United States Patent
Shayne et al.

(10) Patent No.: US 11,823,452 B2
(45) Date of Patent: Nov. 21, 2023

(54) VIDEO ANALYTICS EVALUATION

(71) Applicant: Alarm.com Incorporated, Tysons, VA (US)

(72) Inventors: Ethan Shayne, Clifton Park, NY (US); Donald Gerard Madden, Columbia, MD (US); Daniel Todd Kerzner, McLean, VA (US); Allison Beach, Leesburg, VA (US); Benjamin Asher Berg, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 136 days.

(21) Appl. No.: 17/153,486

(22) Filed: Jan. 20, 2021

(65) Prior Publication Data

US 2021/0232824 A1 Jul. 29, 2021

Related U.S. Application Data

(60) Provisional application No. 62/964,689, filed on Jan. 23, 2020.

(51) Int. Cl.
| | | |
|---|---|---|
| *G06V 20/40* | (2022.01) | |
| *G06F 3/04842* | (2022.01) | |
| *H04N 7/18* | (2006.01) | |
| *G06T 7/20* | (2017.01) | |
| *G06V 20/52* | (2022.01) | |

(52) U.S. Cl.
CPC .......... *G06V 20/40* (2022.01); *G06F 3/04842* (2013.01); *G06T 7/20* (2013.01); *G06V 20/52* (2022.01); *H04N 7/185* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 8,775,916 B2 | 7/2014 | Pulsipher et al. | |
| 9,147,129 B2 | 9/2015 | Liu et al. | |
| 9,495,764 B1 | 11/2016 | Boardman et al. | |
| 10,372,970 B2 | 8/2019 | Wang et al. | |
| 10,645,366 B2 | 5/2020 | Rowell | |
| 10,803,667 B1 * | 10/2020 | Madden | G06T 19/006 |

(Continued)

*Primary Examiner* — Delomia L Gilliard
(74) *Attorney, Agent, or Firm* — Fish & Richardson P.C.

(57) ABSTRACT

Methods, systems, and apparatus for video analytics evaluation are disclosed. A method includes: identifying a video to display a result of an evaluation of video analysis; identifying a particular time in the video when a video analysis determination does not match a ground truth determination for the video; displaying an image from the particular time in the video; and displaying an indication that the video analysis determination does not match the ground truth determination for the video. Displaying the image from the particular time in the video can include generating a graphical user interface for presentation on a display of a computing device. The indication that the video analysis determination does not match the ground truth determination for the video can include a user-selectable icon. In response to a user selecting the user-selectable icon, the method can include displaying video analysis results for the particular time in the video.

19 Claims, 6 Drawing Sheets

(56) References Cited

U.S. PATENT DOCUMENTS

| | | | |
|---|---|---|---|
| 2003/0185340 A1* | 10/2003 | Frantz | G01N 21/8806 |
| | | | 378/57 |
| 2013/0038737 A1* | 2/2013 | Yehezkel | G11B 27/28 |
| | | | 348/E7.085 |
| 2013/0182114 A1* | 7/2013 | Zhang | A61B 5/1072 |
| | | | 348/150 |
| 2017/0178343 A1* | 6/2017 | Maranatha | G06V 10/809 |
| 2018/0286199 A1* | 10/2018 | Chen | G06V 10/764 |
| 2019/0066472 A1* | 2/2019 | Gagvani | G08B 13/19695 |
| 2019/0235126 A1* | 8/2019 | Petruk | H04N 23/698 |
| 2021/0117658 A1* | 4/2021 | Taheri | G06T 7/254 |
| 2021/0374967 A1* | 12/2021 | Ramanathan | G06T 5/005 |

\* cited by examiner

VIDEO ANALYTICS EVALUATION

CROSS-REFERENCE TO RELATED APPLICATIONS

This application claims the benefit of the U.S. Provisional Patent Application No. 62/964,689 filed Jan. 23, 2020, which is incorporated herein by reference in its entirety.

TECHNICAL FIELD

This disclosure application relates generally to video analytics.

BACKGROUND

Many properties are equipped with monitoring systems that include sensors and connected system components. Some monitoring systems include cameras. Cameras can use computer vision technology to detect and classify objects and events within a field of view.

SUMMARY

Techniques are described for evaluating accuracy of video analytics.

A video analytics evaluation system includes tools and interfaces that can be used to facilitate the curation of a video clip dataset, generate test sets of video clips from the dataset, and analyze and compare the video analytics results of multiple test runs. For an individual video clip, the video analytics evaluation system can identify a particular time in the video clip when a video analytics result does not match a ground truth determination for the video clip. The video analytics evaluation system can display an image from the particular time in the video clip along with an indication that the video analytics result did not match the ground truth determination for the video clip.

Many residents and homeowners equip their properties with monitoring systems to enhance the security, safety, or convenience of their properties. A property monitoring system can include cameras that can obtain visual images of scenes at the property. A camera and connected computer systems can perform video analytics on captured images. Video analytics can include, for example, event detection, object detection, motion detection, person detection, and object classification.

In some examples, objects and events detected by a camera can trigger a property monitoring system to perform one or more actions. For example, detections of events that meet pre-programmed criteria may trigger the property monitoring system to send a notification to a resident of the property or to adjust a setting of the property monitoring system. To perform correct and timely actions, a camera should be able to accurately detect and classify objects and events. It is desirable to be able to test and evaluate video analytics performance of cameras and connected systems, and to display graphical representations of video analytics results through a user interface. Based on viewing the graphical representations of video analytics results, a user can evaluate video analytics system performance. The user can also compare results from multiple test runs in order to monitor the effects of configuration changes on the video analytics system performance.

In order to evaluate the performance of a video analytics system, an evaluation system can curate a dataset of video clips. The video clips may represent common inputs the video analytics operates on, as well as extremes in a number of different dimensions. The set of video clips is large enough to cover a large variety of real-world scenes and conditions, but also limited enough that tests can be run in a timely manner.

The dataset can be collected from a number of cameras, with a number of video clips captured from each camera. For each video clip, there can be one or more video analytics rules, the performance of which is being evaluated in a test. An example rule can include a virtual line crossing. For example, for a camera pointed at a driveway, there may be a video clip where a vehicle pulls into the driveway, and a corresponding rule involving a virtual line crossing in the driveway. The virtual line crossing is expected to trigger when the vehicle crosses the virtual line crossing. The vehicle crossing the virtual line crossing, the time that the vehicle crosses the virtual line crossing, and any data related to the position and movement of the vehicle, can be considered the ground truth for the video clip. The video clip and the associated ground truth represent an individual test case.

Video analytics results for the test case can be evaluated by running the video clip through the video analytics algorithms and comparing the output of the analytics with the ground truth. The evaluation system can collect the results for multiple test cases in a result set. Result set statistics can be displayed to users through a user interface. The user interface can enable searching and filtering video clips and can provide detailed results. The user interface can also enable a user to view a specific time in a video clip that resulted in a positive detection or a negative detection.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
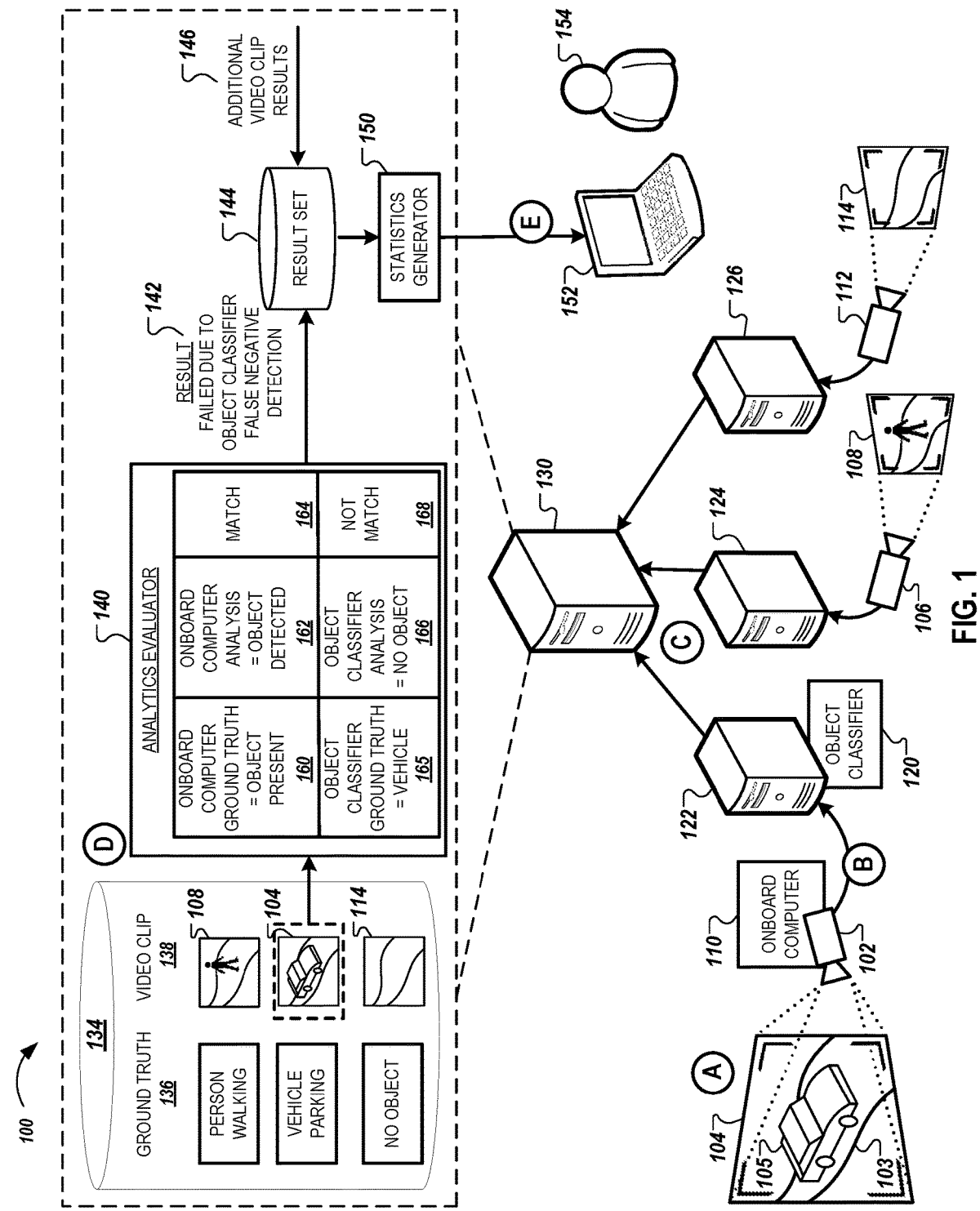
FIG. 1 illustrates an example system for evaluating video analytics results.

FIG. 1 illustrates an example system 100 for evaluating video analytics results.

The system 100 includes an evaluating server 130 that collects video clips captured from multiple cameras. The evaluating server 130 also collects data related to video analysis performed on the video clips. The evaluating server 130 compares video analytics results with ground truth information for the video clips. The evaluating server 130 can generate statistics related to the accuracy of video analytics. The evaluating server 130 can display graphical representations of the statistics to a user 154. The evaluating server 130 can also provide searchable and filterable information regarding detailed video analytics results for individual video clips.

In some examples, the evaluating server 130 can collect video clips from cameras that are installed components of property monitoring systems. The evaluating server 130 can collect any number of video clips. In some examples, the evaluating server 130 may collect thousands or millions of video clips. The evaluating server 130 can collect multiple video clips from a single camera. The evaluating server 130 can also collect video clips from multiple cameras that are components of a single property monitoring system.

The video analytics results determined by the evaluating server 130 for a result set can be provided through a computer-based user interface to users. Based on the video analytics results, users can adjust settings of cameras and video analytics systems, and can monitor the effects of changing settings on the video analytics results.

FIG. 1 illustrates a flow of data, shown as stages (A) to (E), which can represent steps in an example process. Stages (A) to (E) may occur in the illustrated sequence, or in a sequence that is different from the illustrated sequence. For example, some of the stages may occur concurrently.

In stage (A) of FIG. 1, a camera 102 captures a video clip 104. The camera 102 can be, for example, a surveillance camera installed at a property. The camera 102 can be a component of a property monitoring system. In some examples, the camera 102 can be configured to record continuously. In some implementations, the camera 102 can be configured to record at designated times, such as on demand or when triggered by another sensor of the property monitoring system.

The video clip 104 includes a sequence of image frames. The video clip 104 can be of any appropriate length of time. In some examples, the video clip 104 can be a number seconds or a number of minutes long. The video clip 104 shows a vehicle 105 parking in a driveway 103. The camera 102 includes an onboard computer 110 that can perform video analysis on the video clip 104. For example, the onboard computer 110 may perform video analysis to detect a presence, position, and/or movement of objects in the video clip 104.

In stage (B) of FIG. 1, the camera 102 sends the video clip 104 to a server 122. The camera 102 can send the video clip 104 to the server 122, for example, in response to detecting an object in the driveway 103. To support communications with the server 122, the camera 102 may include a communications module, such as a modem, transceiver, modulator, or other hardware or software configured to enable the camera 102 to communicate electronic data to the server 122. The camera 102 can send the video clip 104 to the server 122 over a long-range data link.

The server 122 can be, for example, a remote monitoring server of the property monitoring system. The server 122 can be one or more computer systems, server systems, or other computing devices. In some examples, the server 122 is a cloud computing platform. Although the server 122 in the system 100 receives video clips from one camera, the server 122 can receive video clips from any number of cameras, and can receive video clips from cameras at multiple properties.

In addition to sending the video clip 104, the camera 102 can send results of video analysis performed by the onboard computer 110 to the server 122. For example, the onboard computer 110 can determine through video analysis that an object entered the driveway 103, and may determine the size and position of the object. The camera 102 can send information related to the detection of the object to the server 122.

The server 122 includes an object classifier 120. The object classifier 120 can perform additional video analysis on the video clip 104, e.g., to classify objects detected by the onboard computer 110. For example, based on receiving information related to the detection of the object in the video clip 104, the object classifier 120 can classify the object by labeling the object "vehicle." In some examples, the object classifier 120 may further classify the vehicle 105, e.g., by identifying a make and model of the vehicle. In some examples, the object classifier 120 may identify the vehicle 105 as a specific vehicle belonging to a resident of the property. For example, the object classifier 120 may perform text recognition on a license plate of the vehicle 105 in order to identify the specific vehicle.

Based on results of video analysis performed by the onboard computer 110 and the object classifier 120, the server 122 may perform one or more actions. For example, the server 122 can send an alert or notification to a resident of the property indicating that the vehicle 105 has parked in the driveway 103. In some examples, based on the video analysis, the server 122 can send commands to adjust components of the property monitoring system. For example, based on the object classifier 120 classifying the vehicle 105 as a specific vehicle belonging to a resident, the server 122 may send a command to turn on lights or to adjust a thermostat at the property.

A combination of the camera 102, onboard computer 110, server 122, and object classifier 120 can be considered a "video analytics system." In some examples, the video analytics system can include more or fewer components. In some examples, the video analytics system might not include an object classifier. In some examples, in addition to or instead of the object classifier, the video analytics system may include a person detector, a face detector, and/or a face recognizer. Video analysis can be performed in any order. The performance of the video analytics system, including the individual performance of each independent component, can be evaluated by the evaluating server 130.

In stage (C) of FIG. 1, the server 122 sends the video clip 104 and the results of video analysis to an evaluating server 130. The server 122 also sends video analytics rules governing the video analytics system's analysis and response to the evaluating server 130. The results of the video analysis can include the results of the onboard computer 110 and of the object classifier 120. In some examples, the server 122 may send all video clips to the evaluating server 130. In some examples, the server 122 may send a selection of video clips to the evaluating server 130, e.g., video clips that include a positive detection.

The evaluating server 130 can receive additional video clips from additional servers. For example, the evaluating server 130 can receive video clip 108 captured by camera 106 and sent by server 124. The video clip 108 includes an image of a person walking. The evaluating server 130 can also receive video clip 112 captured by camera 102 and sent by server 126. The video clip 112 includes a background scene with no objects present. The servers 124, 126 can be, for example, monitoring servers for property monitoring systems. Although the system 100 includes three servers, the evaluating server 130 can evaluate video clips from any number of servers.

In stage (D) of FIG. 1, the evaluating server 130 evaluates the video analytics results from the servers 122, 124, 126. The evaluating server 130 collects video clips 138, including the video clips 104, 108, 114, in a database 134. The evaluating server 130 can store the video clips 138 and ground truths 136 of the video clips 138 in the database 134. A single video clip 138 and corresponding ground truth 136 can be considered a "test case." The collection of multiple video clips 138, corresponding ground truths 136, and corresponding rules, can be considered a "test set." Various test sets can be created by filtering and sorting video clips. Filters can be specified to enforce certain distributions, such as 60% of video clips captured in daytime, and 40% of video clips captured at nighttime. The process of evaluating analytics results from a single test set can be considered a "test run."

To determine the ground truth 136, the evaluating server 130 can present the video clips 138 to one or more users who can determine the ground truth 136 based on observing the video clips 138. For each video clip, metadata indicating the ground truth for the video clip can be stored in the database 134. The ground truth for each video clip can be stored in response to receiving user input that includes an observation and a time of the observation. The ground truth 136 can include a number of factors. For example, the ground truth 136 can include whether an object is present, classification of the type of object, a time when the object entered or departed the image frame, movement of the object, whether an event satisfied any rules, and timing of the event satisfying rules. A video clip and the associated ground truth represent an individual test case.

An example rule can include a virtual line crossing. For example, for a camera pointed at a driveway, there may be a video clip where a vehicle pulls into the driveway, and a corresponding rule involving a virtual line crossing in the driveway. The virtual line crossing is expected to trigger when the vehicle crosses the virtual line crossing. The vehicle crossing the virtual line crossing, the time that the vehicle crosses the virtual line crossing, and any data related to the position and movement of the vehicle, can be input by a user and stored as ground truth for the video clip.

An example rule can be related to the presence of objects in a video clip. For example, there may be a video clip where an object enters the field of view, and a corresponding rule involving the presence or absence of the object. For example, for a video clip showing a vehicle entering the field of view, the presence or absence of the vehicle, the time that the vehicle enters or departs the field of view, and the classification of the detected object as a vehicle can be input by a user and stored as ground truth for the video clip. Similarly, for a video clip showing a package being delivered, the presence or absence of the package, the time that the package enters or departs the field of view, and the classification of the detected object as a package can be input by a user and stored as ground truth for the video clip.

An example rule can be related to the presence of humans in a video clip. For example, for a video clip showing a human entering the field of view, the presence or absence of a human, the time that the human enters or departs the field of view, and the classification of the detected object as a human can be input by a user and stored as ground truth for the video clip.

An example rule can be related to be related to identification of known, or familiar, objects. For example, the video analytics system may be configured to identify familiar human faces. For a video clip showing a familiar face, classification of the face as a familiar face and an identification of the familiar face can be input by a user and stored as ground truth for the video clip. Similarly, for a video clip showing a familiar object such as a vehicle, classification of the vehicle as a familiar vehicle, an identification of the familiar vehicle, and an identification of a user associated with the familiar vehicle can be input by a user and stored as ground truth for the video clip.

In the example of FIG. 1, the camera 102 includes a rule that an action is triggered when a vehicle crosses a virtual line crossing in the driveway 103. The action can include, for example, the server 122 sending a notification to a resident, or the server 122 sending a command to activate driveway lights. A user can evaluate the video clip 104 to determine the ground truth 136. The ground truth 136 can include that an object is present, that the object is the vehicle 105, and that the vehicle 105 moves into the driveway 103 and parks. The ground truth 136 can also include that the vehicle 105 crosses the virtual line crossing at a time 3.0 seconds of the video clip 104. The ground truth 136 can also include the color, size, make, and model of the vehicle 105.

The evaluating server 130 includes an analytics evaluator 140 that can compare the ground truth 136 to the video analytics results. The analytics evaluator 140 can determine if each test case resulted in a true positive detection, false positive detection, a true negative detection, or false negative detection.

For object-based analytics, accuracy can be based on detecting an object such as a person, a vehicle, or an animal. Depending on the test case, there may be multiple ground truth objects that appear within the video clip which the analytics should detect. A true positive detection can include accurately detecting and classifying an object. A false positive detection can include detecting and/or classifying an object that is not present. A true negative detection can include accurately identifying that no object is present. A false negative detection can include failing to detect and/or classify an object that is present.

For event-based analytics, accuracy can be based on detecting a discrete event such as a person entering an area or crossing a virtual line crossing. The discrete event can occur within a short period of time, e.g., a few seconds, one second, or less than one second. Depending on the test case, there may be multiple ground truth events which occur within the video clip which the analytics should detect. A ground truth event may be an event that was indicated by a user as having occurred within the video clip. Similarly, there may be multiple times the analytics detects an event, even if there are no ground truth events. Therefore, the results of each test case are presented as a chronological list of events.

A true positive event can include detecting the proper event at approximately the same time as specified by the ground truth. A detection occurring at approximately the same time specified by ground truth can include a detection at a time that is less than a programmed time deviation from the ground truth time of the event. For example, a programmed time deviation may be 0.2 seconds, 0.3 seconds, or 0.6 seconds before or after the ground truth time of the event. A detection at a time that is less than a programmed time deviation before or after the ground truth time of the event can be considered to occur at approximately the same time specified by ground truth. A false positive event can include detecting an event, but with no matching ground truth event at that approximate time. A false negative event can include failing to detect an event at the approximate time of a ground truth event. A true negative event can include not detecting an event, with no matching ground truth event at that approximate time.

In some cases, for event-based analytics, accuracy can be based on detecting a number of events that occur within a larger window of time, e.g., one hour, several hours, or one day. Thus, the analytics evaluator 140 can aggregate event-level results over an extended video clip test case, to produce a higher level test case result.

In some examples, a true positive result can include the analytics and ground truth both agreeing that there is at least one event within the extended video clip. A true positive event can also include accurately identifying the number of events within the extended video clip, such that the analytics and ground truth both count the same number of events. A false positive event can include detecting one or more events, but with no matching ground truth events within the extended video clip. A false positive event can also include the analytics counting more events than ground truth. A false negative event can include failing to detect any events, but with at least one ground truth event within the extended video clip. A false negative event can also include the analytics counting fewer events than ground truth. A true negative event can include not detecting any events, with no ground truth events within the extended video clip.

The analytics evaluator 140 can compare the ground truth 136 to the video analytics results from various stages of analysis, e.g., for the onboard computer 110 and the object classifier 120. In some examples, the onboard computer 110 may produce accurate results, while the object classifier 120 may produce inaccurate results. In some examples, both the onboard computer 110 and the object classifier may produce accurate results, or both the onboard computer 110 and the object classifier 120 may produce inaccurate results.

For the video clip 104, the analytics evaluator 140 determines whether the onboard computer analysis 162 matches the onboard computer ground truth 160. Specifically, the ground truth 160 for the onboard computer 110 includes that an object is present. The onboard computer analysis 162 resulted in an object detected. Since the ground truth 160 and the onboard computer analysis 162 match 164, the analytics evaluator 140 determines that the onboard computer 110 accurately detected the object.

The analytics evaluator 140 also determines whether the object classifier analysis 166 matches the object classifier ground truth 165. Specifically, the ground truth 165 for the object classifier 120 includes that the detected object is a vehicle 105. The object classifier analysis 166 resulted in no object classified. Since the ground truth 165 and the object classifier analysis 166 do not match 168, the analytics evaluator 140 determines that the object classifier 120 failed to accurately classify the object.

The analytics evaluator 140 can apply matching thresholds when evaluating analytics results. For example, object detections may be required to match within a certain number of pixels in order to be considered a match. In some examples, detected events may be required to match within a certain amount of time in order to be considered a match. Thus, the onboard computer analysis 162 and the object classifier analysis 166 can differ slightly from the ground truths 160, 165, and the analytics evaluator 140 can consider the results a match.

In some examples, the analytics evaluator 140 may determine additional measures of accuracy for the onboard computer 110 and/or the object classifier. For example, the ground truth 136 for the video clip 104 includes the vehicle 105 crossing a virtual line crossing at time 3.0 seconds. The analytics evaluator 140 can determine that the server 122 registered the vehicle 105 crossing the virtual line crossing at time 3.5 seconds. The analytics evaluator 140 can then determine that the server 122 was delayed by 0.5 seconds. The analytics evaluator 140 can evaluate the times of onboard computer 110 detection and object classifier 120 detection to identify the cause of the delay.

The analytics evaluator 140 can be configured to produce a result for an overall test case as "passed" or "failed" based on various criteria. In some examples, the test case may fail if the video analytics system produces any false positives or false negatives on the event level. In some examples, the test case may pass or fail based on event result aggregation.

The result 142 of the analytics evaluator 140 for the video clip 104 is that the video analytics failed due to the object classifier outputting a false negative detection. The evaluating server 130 can store the result 142 as part of a result set 144. The result set 144 can include additional video clip results 146. The additional video clip results 146 can include, for example, results from the video clips 108 and 114.

The evaluating server 130 includes a statistics generator 150. The statistics generator 150 can generate statistics from the result set 144. The statistics can include percentages of results that include true positive detections, true negative detections, false positive detections, and false negative detections. The statistics can also include an overall number and/or percentage of test cases and events that passed and failed.

The statistics can also include detailed information regarding categories of failed test cases. The detailed information can include failure rates of the onboard computer 110 and the object classifier 120. The statistics can include success and failure rates for various types of objects, e.g., vehicles, people, and animals. The statistics can also include success and failure rates for various environmental conditions, e.g., lighting levels and precipitation levels. The statistics can include success and failure rates for various types of scenes, e.g., driveway scenes, front door scenes, and indoor scenes.

The statistics generator 150 can generate statistics with different weighting on each video clip to more accurately match the significance of the video clips. For example, eight hours of video that represent an empty house during the day may be less significant than ten minutes of video that shows residents and visitors arriving and departing. The statistics generator 150 can weigh video clips from the ten minutes of activity with a higher weight than the eight hours of empty house video.

In stage (E) of FIG. 1, the evaluating server 130 provides a display of video analytics results to a user 154 through a computing device 152. The display can include images from video clips 138. The display can also include information related to object detection and classification accuracy. The display can show the total distribution of each test case attribute numerically and/or as a chart.

The user 154 can be, for example, an administrator of property monitoring systems. The user 154 may make adjustments to settings and parameters of video analytics system components based on the video analytics results. For example, the user 154 may adjust settings of cameras, onboard computers, and/or object classifiers. Upon adjusting settings, the user 154 can command the evaluating server 130 to perform additional test runs through the computing device 152. The user 154 can view and compare the results of multiple test runs with different settings, in order to determine settings that meet requirements of individual use cases.

The user 154 can view an entire test set that may be organized by video clip or by camera. The user 154 can attach descriptive tags to video clips that represent object or conditions of the video clips. For example, the user 154 can attach a tag "snow" to a video clip that includes images of snow, and "daytime" to a video clip captured during the day. The user 154 can attach a tag "driveway" to a camera that overlooks a driveway.

Figure 3:
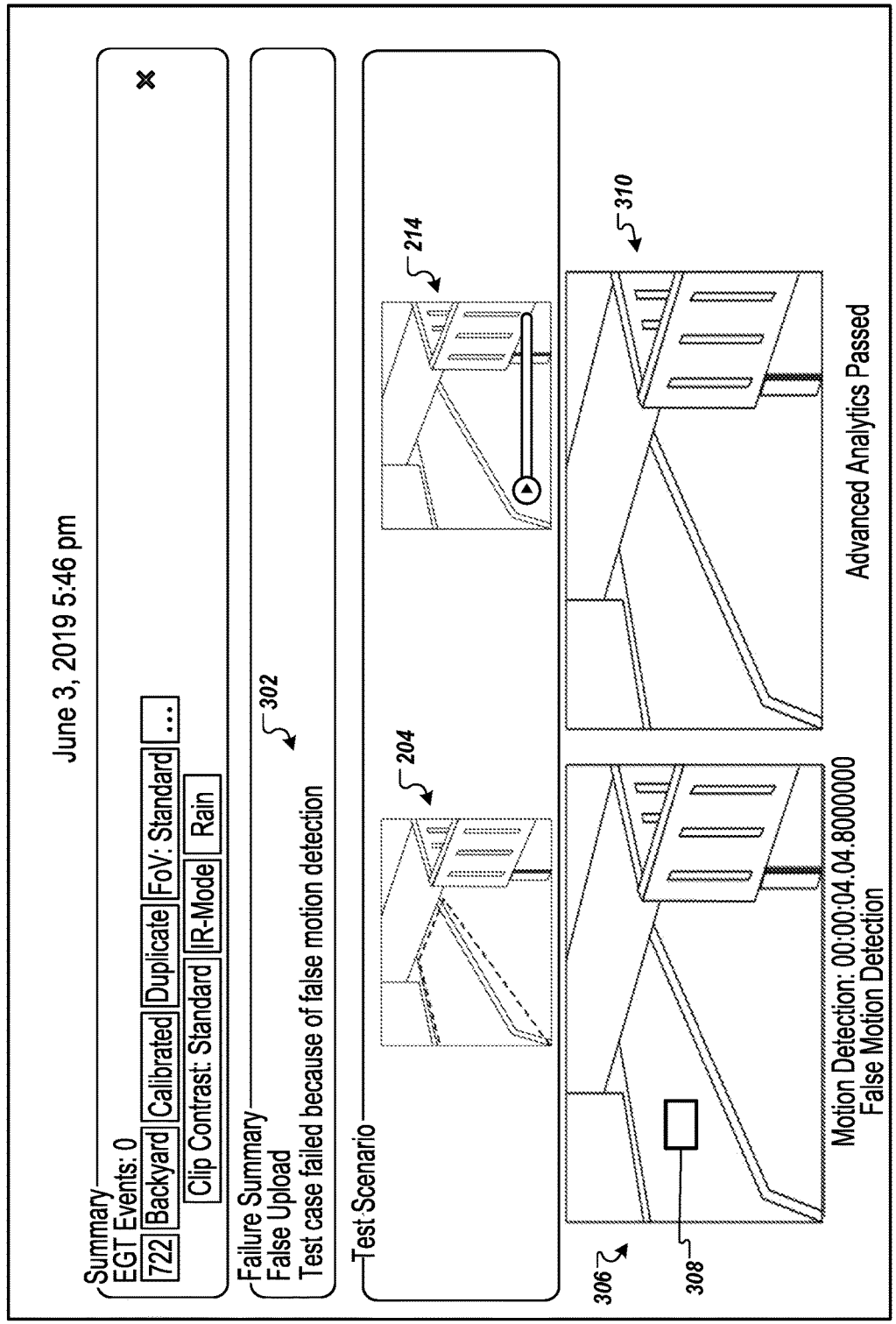
FIG. 3 illustrates an example user interface display showing detailed video analytics results.
Figure 4:
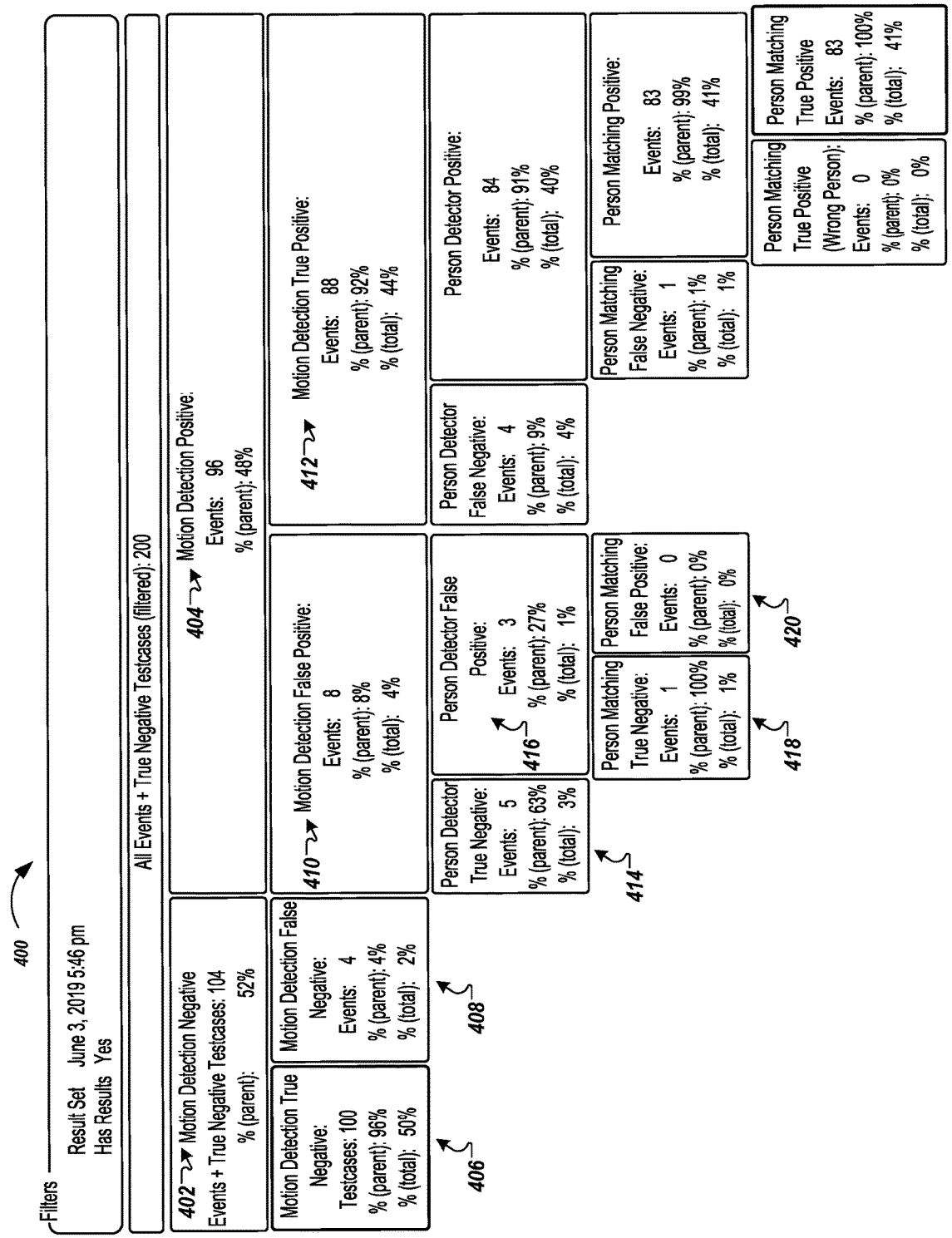
FIG. 4 illustrates an example user interface display showing video analytics results statistics.

The user 154 can use the tags to search or filter the display. The user 154 can also use the tags to generate new test sets for subsequent test runs. In some examples, the user 154 can perform a tag-based search using language to express more complex filters ("driveway" AND "daytime" AND NOT "snow"). Other data such as camera type or ground truth attributes can also be used to filter the dataset. For example, the user 154 can create a filter that shows only test cases from outdoor cameras that contain at least one person and one animal crossing a virtual line crossing. Examples of user interfaces that display graphical representations of video analytics results, as well as searchable and filterable video clips, are shown in FIGS. 2 to 4.

Figure 2:
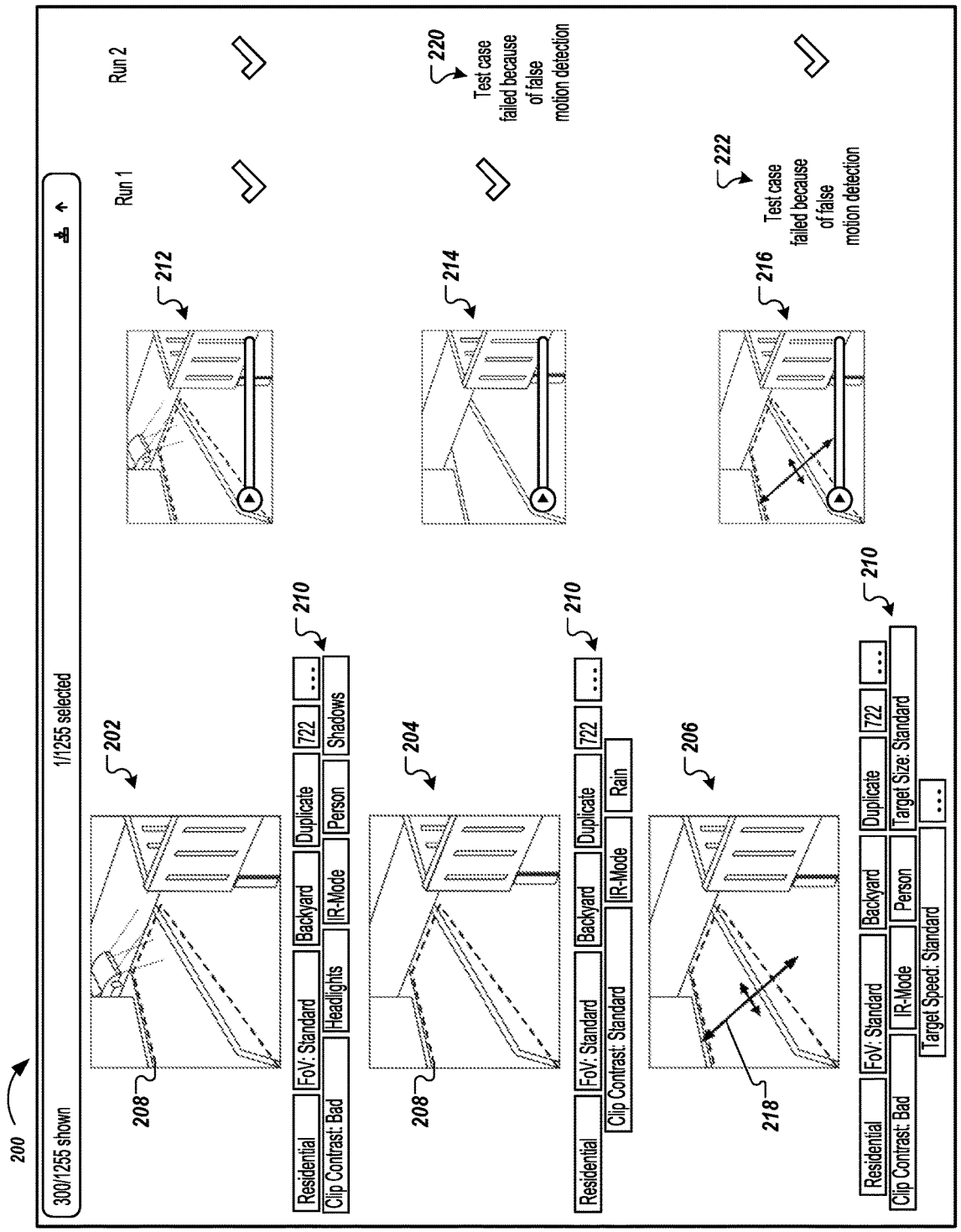
FIG. 2 illustrates an example user interface display showing video analytics results for two test runs.

FIG. 2 illustrates an example user interface display 200 of video analytics results for two test runs. The display 200 can be displayed to a user, e.g., the user 154, on a computing device, e.g., the computing device 152. The user can interact with the display 200, e.g., by sorting video clips and/or searching for video clips. The results of each test case in the test set are displayed alongside the corresponding images. The results can include an overall pass/fail indication, such as a check-mark. The results can also include details as to why a test case failed. For example, the results for each failed run can indicate the component that caused the test case to fail. In some examples, the user interface display 200 may display video analytics results for only one test run.

The display 200 shows results of three test cases. The display 200 shows three images 202, 204, 206. The three images 202, 204, 206 are image representations of three different video clips 212, 214, 216 captured from the same camera overlooking a driveway scene. Each image 202, 204, 206 represents a time in the video clips 212, 214, 216. The images 202, 204, 206 can optionally represent a time in the video clips 212, 214, 216 during which the video analytics produced either a true detection or a false detection. A user can view each of the video clips 212, 214, 216 by clicking on the video clips.

The images 202, 204, 206 each include tags 210. The tags 210 enable the user to filter and search for the tagged images and corresponding video clips. The tags 210 include tags that refer to installation location ("Residential," "Backyard"), tags that refer to camera mode ("IR [infrared]-mode") tags that refer to detected objects ("Person," "Headlights"), and tags that refer to environmental conditions ("Shadows," "Rain").

In some examples, the tags 210 can be generated by a user. For example, a user can observe rain in the video clip 214, and assign the tag "Rain" to the video clip 214. In some examples, the tags 210 can be generated by the camera or another component of the video analytics system. For example, a camera operating in IR mode can produce a video clip pre-tagged with the tag "IR mode."

The display 200 shows video analytics results output by the analytics evaluator 140 for two test runs, Run 1 and Run 2. Run 1 is performed using a first set of parameters, while Run 2 is performed using a second set of parameters. Run 1 and Run 2 can each include comparing ground truth to video analytics results for a test set that includes video clips 212, 214, and 216 from the driveway camera. The test set can be selected by a user, for example, by selecting a specific camera to evaluate, or by performing a search for video clips tagged with the word "driveway." In some examples, the test set can be a standard regression test set, rather than a custom query entered by a user.

The ground truth of image 202 includes light from headlights of a car. The camera detects the light from the headlights within the driveway boundary 208. The analytics evaluator 140 determines that the video analytics system accurately detected and classified the headlights in both Run 1 and Run 2. The display 200 therefore displays check-marks next to the image 202 for both Run 1 and Run 2. The check-marks indicate that overall, Run 1 and Run 2 passed the video analytics test.

The ground truth of image 204 includes no motion within the driveway boundary 208. In Run 1, the video analytics system did not detect any motion. Thus, the display 200 displays a check-mark next to the image 204 for Run 1. In Run 2, the video analytics system falsely detected an object within the driveway boundary 208. The display 200 displays a failure indication 220 stating "Test case failed because of false motion detection" next to the image 204 for Run 2. The user can click on "Test case failed because of false motion detection" to obtain additional information regarding the failure of the test case. The additional information is described in greater detail with reference to FIG. 3.

The ground truth of image 206 includes no objects crossing a virtual line crossing 218. In Run 1, the video analytics system falsely detected an object crossing the virtual line crossing 218. Thus, the display 200 displays a failure indication 222 stating "Test case failed because of false motion detection" displays next to the image 206 for Run 1. The user can click on "Test case failed because of false motion detection" to obtain additional information regarding the failure of the test case. In Run 2, the video analytics system accurately did not detect an object crossing the virtual line crossing 218. Thus, the display 200 displays a check-mark next to the image 206 for Run 2.

By comparing Run 1 and Run 2, a user can determine settings and parameters for improving video analytics accuracy. By performing multiple test runs, the user can observe the effects of changing settings on accuracy for the motion detector, the advanced analytics, and the video analytics system as a whole. Additionally, the user can configure video analytics systems for improved performance in designated conditions. For example, accuracy may be improved by increasing detection sensitivity in certain environmental conditions, and by decreasing detection sensitivity in other environmental conditions. Similarly, certain settings and configurations may improve accuracy in indoor installation, while worsening accuracy in outdoor installations. The display 200 can illustrate the improvements and degradations caused by these changes in various conditions and locations.

FIG. 3 illustrates an example user interface display 300 of detailed video analytics results. Specifically, the display 300 shows detailed video analytics results for the image 204 from the video clip 214 during Run 2. The display 300 illustrates an example display that a user might view upon clicking on the failure indication 220 for the image 204.

The display 300 shows a detailed comparison of the output of the analytics compared to the ground truth. The display 300 can indicate in which analysis step an error was made. For example, the display 300 includes a failure summary 302. The failure summary 302 states "False Upload; Test case failed because of false motion detection." In this example, the motion detector falsely detected an object in the driveway. In response to falsely detecting the object, the camera uploaded the video clip 214 to the server, resulting in the "False Upload."

The display 300 can show visualizations of the analytics and ground truth. The visualizations can include marked up images and/or video clips for the test case. The user can play the video clip 214 and can jump or skip the video clip 214 to certain times. For example, the user can jump the video clip 214 to the time an event was detected, or to the time an event should have been detected, based on the ground truth.

The display 300 shows an image 306 that illustrates the false motion detection. The motion detector detected a moving object in the driveway at bounding box 308 in the image 306. The display 300 also shows the image 310 as evaluated by the advanced analytics. The advanced analytics accurately detected no motion in the driveway.

In some examples, the analytics evaluator can identify specific errors made by components of the video analytics system. For example, advanced analytics may merge two objects together, and inaccurately classify the two objects as a single object. In another example, advanced analytics may incorrectly classify an object, e.g., by classifying an inanimate object as a person. In some examples, virtual line crossings may be set in incorrect positions. In some examples, errors can be caused by latency issues, e.g., the video analytics system may detect the presence of an object, but with a time delay. These examples of inaccuracies can lead to false detections. The display 300 can display marked up images showing the specific errors made by the video analytics system. Based on the specific errors, users can change settings or parameters, and re-run a test set to evaluate improvement.

FIG. 4 illustrates an example user interface display 400 of video analytics results statistics. The display 400 graphically represents a decision tree used by the video analytics system. The display 400 shows the percentage and number of filtered events and true negative test cases that reach each node of the decision tree. The display 400 provides users with a snapshot of results of the video analytics evaluation for an entire test set.

The display 400 shows a graphical representation of a decision tree for a result set. The result set includes results from 200 total test cases. The display 400 shows a breakdown of "Motion Detection Negative" 402 and "Motion Detection Positive" 404, including both the number and percentage of each category.

The Motion Detection Negative 402 category includes true negative test cases, i.e., cases for which no event occurred, and for which the motion detector did not detect an event. The Motion Detection Negative 402 category also includes false negative events, i.e., events that occurred, but which the motion detector failed to detect. Under the category of Motion Detection Negative 402, the display shows the number and percentages of "Motion Detection True Negative" 406 and "Motion Detection False Negative" 408 detections. Any test cases or events that were classified "negative" by the motion detector were not uploaded to the server. Therefore, no further categorization is shown under Motion Detection Negative 402.

Motion Detection Positive 404 test cases are cases for which the motion detector detected an event. Under the category of Motion Detection Positive 404 test cases, the display 400 shows the number of "Motion Detection False Positive" 410 and "Motion Detection True Positive" 412 detections. Test cases that were classified "positive" by the motion detector were uploaded to the server for evaluation by advanced analytics, e.g., by a person detector. Thus, additional categorizations are shown under Motion Detection Positive detections 404.

"Person Detector True Negative" 414 cases are cases for which the motion detector produced a false positive detection, and the object classifier produced a true negative detection. "Person Detector False Positive" 416 cases are cases for which the motion detector produced a false positive detection, and the object classifier also produced a false positive detection.

Under "Person Detector False Positive" 416, cases can be categorized as "OC Matching True Negative" 418 or "Person Matching False Positive" 420. "Person Matching True Negative" 418 and "Person Matching False Positive" 420 indicate whether the object classifier accurately classified the event, such that the classification output matched the ground truth. Similarly, under "Motion Detection True Positive" 412 detections, the display 400 shows details regarding the performance of the object classifier in classifying events to match the ground truth.

A user can view the display 400 and quickly identify performance results of the motion detector, the object classifier, and the video analytics system as a whole. For example, the user viewing the display 400 can identify that the motion detector accurately detected 96% of negative test cases, e.g. test cases in which the ground truth included no events. The user can also identify that for cases in which the motion detector detected an event, 8% of the test cases were a false positive detection, e.g., the ground truth did not include the detected event. Similarly, the user can identify that of the true positive detections detected by the motion detector, 91% of the test cases also resulted in a positive detection by the object classifier.

The user can adjust settings of video analytics system components, and re-run the same test set. The user can then compare a graphical representation of the new results to the result set shown in the display 400, to identify any improvements or degradation in performance caused by the adjusted settings.

Figure 5:
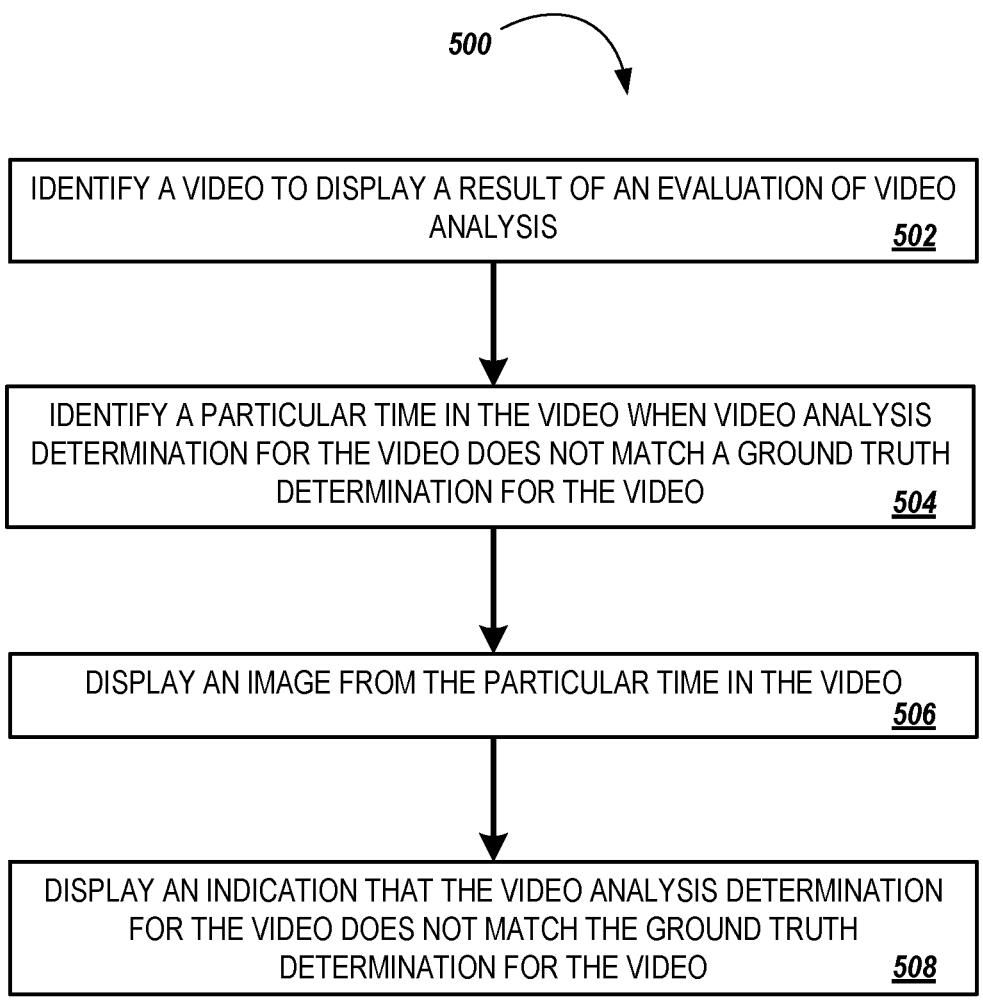
FIG. 5 is a flow diagram of an example process for evaluating and displaying video analytics results.

FIG. 5 is a flow diagram of an example process 500 for evaluating and displaying video analytics results.

Briefly, process 500 includes identifying a video to display a result of an evaluation of video analysis (502), identifying a particular time in the video when a video analysis determination does not match a ground truth determination for the video (504), displaying an image from the particular time in the video (506), and displaying an indication that the video analysis determination does not match the ground truth determination for the video (508).

In additional detail, the process 500 includes identifying a video to display a result of an evaluation of video analysis (502). In some implementations, identifying the video to display the result of the evaluation of video analysis includes selecting a video clip from a database of stored video clips. For example, the analytics evaluator 140 can select the video clip 108 from the database 134 of stored video clips 138 and may determine to display a result of an evaluation of video analysis for the video clip 108. The video clip 108 shows a person walking on a sidewalk in a residential neighborhood. The video clip 108 is attached with descriptive tags "Residential," "Person," and "Sidewalk." Identifying the video to display a result of an evaluation of video analysis may be based on the video matching a search entered by a user through a user interface. For example, the video analytics evaluator 140 may identify to display a result of the evaluation of the video clip 108 based on the video clip 108 matching a user search including the search terms "Residential," "Person," and/or "Sidewalk."

The video may include a ground truth event, or might not include a ground truth event. An example video that includes a ground truth event can be the video clip 108 showing a person walking. Identifying the video to display can include identifying a length of the video clip to display. The length of the video clip may be determined by a length of an event within the video clip. For example, the person in the video clip 108 may walk through a field of view of a camera. The video analysis system can determine to begin the video clip 108 when the person enters the field of view, and to end the video clip 108 when the person exits the field of view.

The process 500 includes identifying a particular time in the video when a video analysis determination does not match a ground truth determination for the video (504). For example, the video analytics evaluator 140 may determine that stored data indicates a ground truth determination for the video that the person crosses a virtual line crossing at time 4.0 seconds and determine that video analysis result from the video analysis is that the person does not cross the virtual line crossing so does not match. The video analytics evaluator 140 can identify the time of 4.0 seconds when the ground truth determination does not match the video analysis result.

In some implementations, identifying the particular time in the video when the video analysis determination does not match the ground truth determination for the video includes identifying the particular time in the video when one or more of a false positive motion detection event, a false negative motion detection event, a false positive object detection event, a false negative object detection event, or a false object classification event occurred.

For example, the analytics evaluator 140 can identify a particular time in the video when a false positive motion detection event occurred. A false positive motion detection event can include detecting motion of an object when the ground determination indicates that no motion occurred. For example, a false positive motion detection event can include detecting motion in the video clip 114 when the ground truth determination indicates that no motion occurred.

In some examples, the analytics evaluator 140 can identify a particular time in the video when a false negative motion detection event occurred. A false negative motion detection event can include failing to detect motion of an object when the ground truth determination indicates that motion occurred. For example, a false negative motion detection event can include failing to detect motion of the person in video clip 108 when the ground truth determination indicates that motion occurred.

In some examples, the analytics evaluator 140 can identify a particular time in the video when a false positive object detection event occurred. A false positive object detection event can include detecting an object when the ground truth determination indicates that the object is not present, or that no object is present. For example, a false positive object detection event can include detecting an object in the video clip 114 when the ground truth determination indicates that no object is present.

In some examples, the analytics evaluator 140 can identify a particular time in the video when a false negative object detection event occurred. A false negative object detection event can include failing to detect the presence of an object when the ground truth determination indicates that the object is present. For example, a false negative object detection event can include failing to detect an object in the video clip 104, when the ground truth determination indicates the presence of the vehicle 105 in the video clip 104.

In some examples, the analytics evaluator 140 can identify a particular time in the video when a false object classification event occurred. A false object classification event can include classifying the object as a particular type of object when the ground truth determination indicates that the object is a different type of object. For example, a false object classification event can include classifying the object in the video clip 108 as an animal, when the ground truth determination indicates that the object in the video clip 108 is a person.

In some implementations, identifying the particular time in the video when the video analysis determination does not match the ground truth determination for the video includes identifying the particular time in the video when a motion detection latency occurred. A motion detection latency can include detecting motion detection at a time in the video that is greater than a threshold time duration after ground truth motion detection. A threshold time duration can be, for example, 0.5 seconds, 0.7 seconds, 1.0 seconds, etc. Motion detection latency can include detecting motion of the person in the video clip 108 at a time in the video that is greater than a threshold time duration of 1.0 seconds after the ground truth motion detection.

In some implementations, identifying the particular time in the video when the video analysis determination does not match the ground truth determination for the video includes identifying the particular time in the video when an object detection latency occurred. An object detection latency can include object detection at a time in the video that is greater than a threshold time duration after ground truth object detection. A threshold time duration can be, for example, 0.3 seconds, 0.6 seconds, 0.8 seconds, etc. Object detection latency ca include detecting an object in the video clip 104 at a time in the video that is greater than a threshold time duration of 0.8 seconds after the ground truth object detection.

The process 500 includes displaying an image from the particular time in the video (506). For example, in response to determining that at the time of 4.0 seconds the ground truth determination does not match the video analysis result, the video analytics evaluator 140 may display the image from the video clip 108 at the time of 4.0 seconds. The image can include the person crossing the virtual line crossing.

In some implementations, displaying the image from the particular time in the video includes generating a graphical user interface for presentation on a display of a computing device. For example, the evaluating server 130 can generate the user interface display 200 for presentation on a display of the computing device 152.

The process 500 includes displaying an indication that the video analysis determination does not match the ground truth determination for the video (508). Displaying the indication that the result did not match the ground truth (508) can occur in parallel with displaying the image from the particular time in the video (506). The indication can include markings on the image showing the video analysis detection or non-detection. For example, in response to determining that at the time of 4.0 seconds the ground truth determination does not match the video analysis result, the video analytics evaluator 140 may display, for the video clip 108, markings that include an illustration of the virtual line crossing, and a bounding box around the person. The indication can also include color coding, such as circling the image in a red outline. The indication can include text displayed near the image. The text can include, for example, the words "failed," or "not match." The text can also include detailed information regarding the reason that the video analysis did not match the ground truth determination. For example, the text can state "Failed due to false negative motion detection," indicating that the motion detector failed to detect the person crossing the virtual line crossing.

In some implementations, displaying the indication that the video analysis determination does not match the ground truth determination includes displaying a depiction of a virtual line crossing. For example, the indication that the video analysis determination does not match the ground truth determination can include the depiction of the virtual line crossing 218 in the image 206. The virtual line crossing can be a virtual line that, if crossed by an object, causes the system to perform an action. For example, in response to detecting a vehicle crossing the virtual line crossing 218, the system may perform an action such as sending an instruction to open a garage door. Though described as a "line," the virtual line crossing can be any appropriate shape, e.g., curved, jagged, etc.

In some implementations, displaying the indication that the video analysis determination does not match the ground truth determination includes displaying a depiction of a bounding box. For example, the indication that the video analysis determination does not match the ground truth determination can include the depiction of the bounding box 308 in the image 306.

In some implementations, the bounding box is positioned around a region of the image where the video analysis determination or the ground truth determination detected an object. For example, in the event of a false positive object detection, the bounding box 308 may be positioned around a region of the image 306 where the video analysis results indicated an object was located, when the ground truth determination indicated that no object was present. In the event of a false negative object detection, the bounding box 308 may be positioned around a region of the image 306 where the ground truth determination indicated an object was located, when the video analysis determination indicated no object detected.

In some implementations, the bounding box is positioned around a region of the image where the video analysis determination or the ground truth determination detected motion. For example, in the event of a false positive motion detection, the bounding box 308 may be positioned around a region of the image 306 where the video analysis results indicated that motion occurred, when the ground truth determination indicated that no motion occurred. In the event of a false negative motion detection, the bounding box 308 may be positioned around a region of the image 306 where the ground truth determination indicated that motion occurred, when the video analysis results indicated that no motion occurred.

In some implementations, displaying the indication that the video analysis determination does not match ground truth determination include displaying an object label. For example, in the event of an incorrect classification of an animal as a human, the object label may be displayed near the animal and include the text "human." In the event of an incorrect identification of a familiar face as Joe instead of Jim, the object label may be displayed near the familiar face of Jim and include the text "Joe."

In some implementations, displaying the indication that the video analysis determination does not match the ground truth determination includes displaying a depiction of boundaries around a portion of the image that corresponds to an area of interest. For example, the indication that the video analysis determination does not match the ground truth determination can include displaying the depiction of driveway boundaries 208. In this example, the driveway is an area of interest. The driveway boundaries 208 are positioned around the portion of the image that corresponds to the driveway.

In some implementations, the area of interest includes an area of a property that is monitored by a camera that captured the video. For example, the driveway is an area of a property that is monitored by a camera, e.g., the camera 102. Events that occur within the area of interest, e.g., object detection events, motion detection events, etc., can trigger the system to perform an action. For example, upon detecting motion within the driveway, the system can generate a notification to transmit to a user indicating that motion was detected in the driveway. In another example, upon detecting motion within the driveway, the system can transmit an instruction to a device, such as transmitting an instruction that causes a light to illuminate near the driveway. In some implementations, the system might not detect or classify objects within the image that are outside of the area of interest.

In some implementations, displaying the indication that the video analysis determination does not match the ground truth determination includes displaying text indicating that the video analysis determination does not match the ground truth determination. For example, the indication that the video analysis determination does not match the ground truth determination can include displaying text such as the failure indication 220 that states "Test case failed because of false motion detection." The text can also include, for example, symbols such as a check-mark to indicate test success, or an "X" to indicate test failure.

In some implementations, the indication that the video analysis determination does not match the ground truth determination for the video includes a user-selectable icon. For example, the failure notification 220 may be a user-selectable icon. In response to a user selecting the user-selectable icon, the method can include displaying video analysis results for the particular time in the video. For example, in response to a user selecting the user-selectable icon, the system may display additional detail about the test failure. As an example, in response to a user selecting the user-selectable icon 220, the system can display the display 300. The display 300 includes additional detail about the test failure, including the time of failure, the reason for failure, and camera settings at the time of failure.

In some implementations, the video analysis includes first video analysis of the video. The method can include displaying a result of an evaluation of second video analysis that is different from the first video analysis by obtaining a second video analysis determination on the video at the particular time in the video and displaying an indication of whether the second video analysis determination on the video matches the ground truth determination for the video. For example, the first video analysis can be "Run 1" and the second video analysis can be "Run 2." Run 1 and Run 2 can be performed using different sets of video analysis parameters. Run 1 and Run 2 can be performed on the same video. The system can display results of a video analysis evaluation for both Run 1 and for Run 2, as shown in the display 200. The system can display the results for Run 1 and for Run 2 at the same time in the video, in order to allow a user to compare the results for Run 1 and Run 2.

Figure 6:
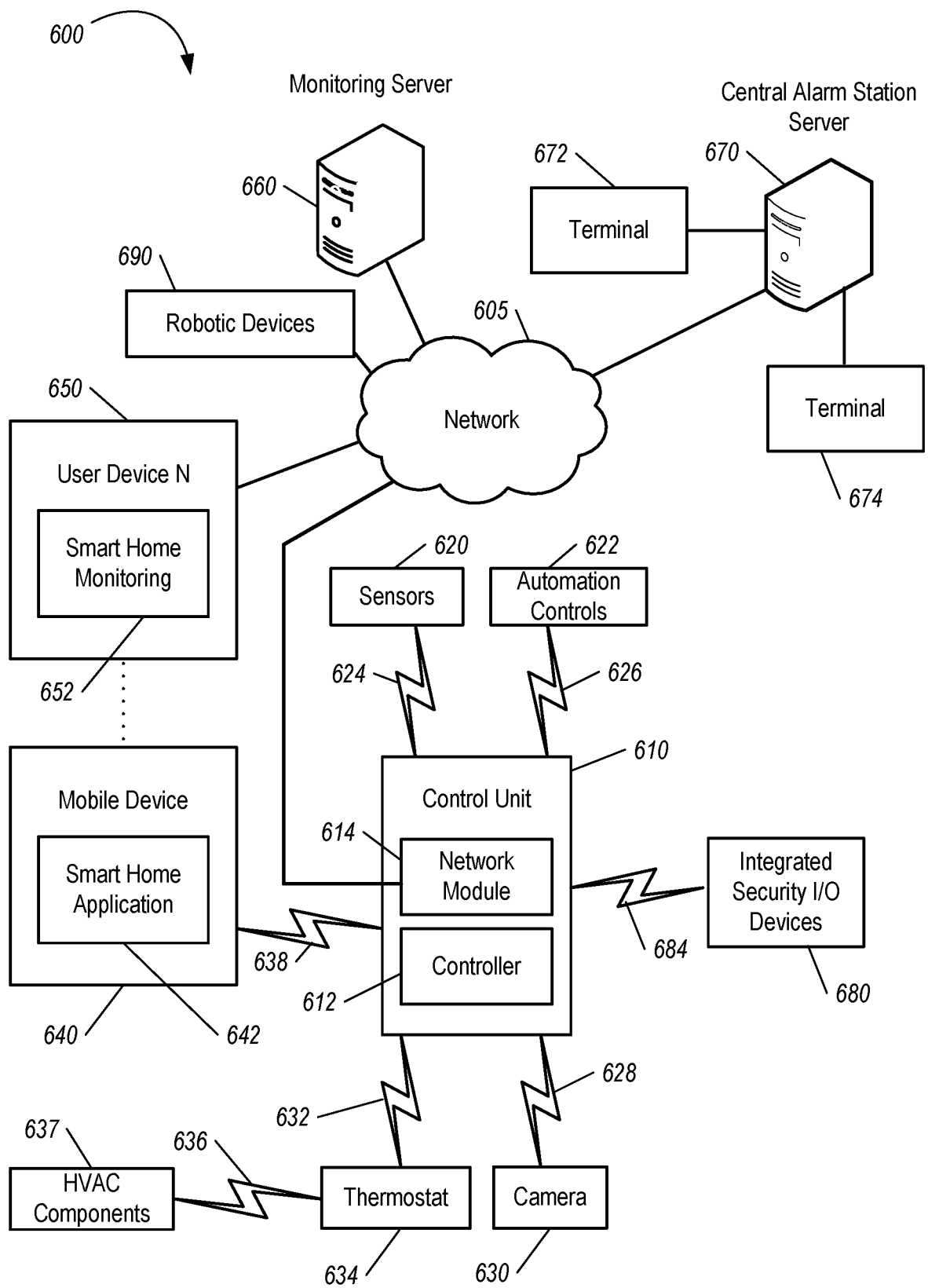
FIG. 6 is a diagram illustrating an example of a home monitoring system.

FIG. 6 is a diagram illustrating an example of a home monitoring system 600. The monitoring system 600 includes a network 605, a control unit 610, one or more user devices 640 and 650, a monitoring server 660, and a central alarm station server 670. In some examples, the network 605 facilitates communications between the control unit 610, the one or more user devices 640 and 650, the monitoring server 660, and the central alarm station server 670.

The network 605 is configured to enable exchange of electronic communications between devices connected to the network 605. For example, the network 605 may be configured to enable exchange of electronic communications between the control unit 610, the one or more user devices 640 and 650, the monitoring server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 may include a processor or other control circuitry configured to execute instructions of a program that controls operation of a control unit system. In these examples, the controller 612 may be configured to receive input from sensors, flow meters, or other devices included in the control unit system and control operations of devices included in the household (e.g., speakers, lights, doors, etc.). For example, the controller 612 may be configured to control operation of the network module 614 included in the control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the control unit 610 to communicate over a local area network and/or the Internet. The network module 614 also may be a voice band modem configured to enable the alarm panel to communicate over the telephone lines of Plain Old Telephone Systems (POTS).

The control unit system that includes the control unit 610 includes one or more sensors. For example, the monitoring system may include multiple sensors 620. The sensors 620 may include a lock sensor, a contact sensor, a motion sensor, or any other type of sensor included in a control unit system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 620 can also include a radio-frequency identification (RFID) sensor that identifies a particular article that includes a pre-assigned RFID tag.

The control unit 610 communicates with the home automation controls 622 and a camera 630 to perform monitoring. The home automation controls 622 are connected to one or more devices that enable automation of actions in the home. For instance, the home automation controls 622 may be connected to one or more lighting systems and may be configured to control operation of the one or more lighting systems. In addition, the home automation controls 622 may be connected to one or more electronic locks at the home and may be configured to control operation of the one or more electronic locks (e.g., control Z-Wave locks using wireless communications in the Z-Wave protocol). Further, the home automation controls 622 may be connected to one or more appliances at the home and may be configured to control operation of the one or more appliances. The home automation controls 622 may include multiple modules that are each specific to the type of device being controlled in an automated manner. The home automation controls 622 may control the one or more devices based on commands received from the control unit 610. For instance, the home automation controls 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building or home monitored by the control unit 610. The camera 630 may be configured to capture single, static images of the area and also video images of the area in which multiple images of the area are captured at a relatively high frequency (e.g., thirty images per second). The camera 630 may be controlled based on commands received from the control unit 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the home automation controls 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring server 660 over the Internet. In these implementations, image data captured by the camera 630 does not pass through the control unit 610 and the camera 630 receives commands related to operation from the monitoring server 660.

The system 600 also includes thermostat 634 to perform dynamic environmental control at the home. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a home and/or environmental data at a home, e.g., at various locations indoors and outdoors at the home. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634. In some implementations, the thermostat 634 is controlled via one or more home automation controls 622.

A module 637 is connected to one or more components of an HVAC system associated with a home, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

In some examples, the system 600 further includes one or more robotic devices 690. The robotic devices 690 may be any type of robots that are capable of moving and taking actions that assist in home monitoring. For example, the robotic devices 690 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 690 may be devices that are intended for other purposes and merely associated with the system 600 for use in appropriate circumstances. For instance, a robotic vacuum cleaner device may be associated with the monitoring system 600 as one of the robotic devices 690 and may be controlled to take action responsive to monitoring system events.

In some examples, the robotic devices 690 automatically navigate within a home. In these examples, the robotic devices 690 include sensors and control processors that guide movement of the robotic devices 690 within the home. For instance, the robotic devices 690 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 690 may include control processors that process output from the various sensors and control the robotic devices 690 to move along a path that reaches the desired destination and avoids obstacles. In this regard, the control processors detect walls or other obstacles in the home and guide movement of the robotic devices 690 in a manner that avoids the walls and other obstacles.

In addition, the robotic devices 690 may store data that describes attributes of the home. For instance, the robotic devices 690 may store a floorplan and/or a three-dimensional model of the home that enables the robotic devices 690 to navigate the home. During initial configuration, the robotic devices 690 may receive the data describing attributes of the home, determine a frame of reference to the data (e.g., a home or reference location in the home), and navigate the home based on the frame of reference and the data describing attributes of the home. Further, initial configuration of the robotic devices 690 also may include learning of one or more navigation patterns in which a user provides input to control the robotic devices 690 to perform a specific navigation action (e.g., fly to an upstairs bedroom and spin around while capturing video and then return to a home charging base). In this regard, the robotic devices 690 may learn and store the navigation patterns such that the robotic devices 690 may automatically repeat the specific navigation actions upon a later request.

In some examples, the robotic devices 690 may include data capture and recording devices. In these examples, the robotic devices 690 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 690 to take and store a biometric sample that can be used to identify the person (e.g., a biometric sample with DNA that can be used for DNA testing).

In some implementations, the robotic devices 690 may include output devices. In these implementations, the robotic devices 690 may include one or more displays, one or more speakers, and/or any type of output devices that allow the robotic devices 690 to communicate information to a nearby user.

The robotic devices 690 also may include a communication module that enables the robotic devices 690 to communicate with the control unit 610, each other, and/or other devices. The communication module may be a wireless communication module that allows the robotic devices 690 to communicate wirelessly. For instance, the communication module may be a Wi-Fi module that enables the robotic devices 690 to communicate over a local wireless network at the home. The communication module further may be a 900 MHz wireless communication module that enables the robotic devices 690 to communicate directly with the control unit 610. Other types of short-range wireless communication protocols, such as Bluetooth, Bluetooth LE, Z-wave, Zigbee, etc., may be used to allow the robotic devices 690 to communicate with other devices in the home. In some implementations, the robotic devices 690 may communicate with each other or with other devices of the system 600 through the network 605.

The robotic devices 690 further may include processor and storage capabilities. The robotic devices 690 may include any suitable processing devices that enable the robotic devices 690 to operate applications and perform the actions described throughout this disclosure. In addition, the robotic devices 690 may include solid-state electronic storage that enables the robotic devices 690 to store applications, configuration data, collected sensor data, and/or any other type of information available to the robotic devices 690.

The robotic devices 690 are associated with one or more charging stations. The charging stations may be located at predefined home base or reference locations in the home. The robotic devices 690 may be configured to navigate to the charging stations after completion of tasks needed to be performed for the monitoring system 600. For instance, after completion of a monitoring operation or upon instruction by the control unit 610, the robotic devices 690 may be configured to automatically fly to and land on one of the charging stations. In this regard, the robotic devices 690 may automatically maintain a fully charged battery in a state in which the robotic devices 690 are ready for use by the monitoring system 600.

The charging stations may be contact based charging stations and/or wireless charging stations. For contact based charging stations, the robotic devices 690 may have readily accessible points of contact that the robotic devices 690 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 690 may charge through a wireless exchange of power. In these cases, the robotic devices 690 need only locate themselves closely enough to the wireless charging stations for the wireless exchange of power to occur. In this regard, the positioning needed to land at a predefined home base or reference location in the home may be less precise than with a contact based charging station. Based on the robotic devices 690 landing at a wireless charging station, the wireless charging station outputs a wireless signal that the robotic devices 690 receive and convert to a power signal that charges a battery maintained on the robotic devices 690.

In some implementations, each of the robotic devices 690 has a corresponding and assigned charging station such that the number of robotic devices 690 equals the number of charging stations. In these implementations, the robotic devices 690 always navigate to the specific charging station assigned to that robotic device. For instance, a first robotic device may always use a first charging station and a second robotic device may always use a second charging station.

In some examples, the robotic devices 690 may share charging stations. For instance, the robotic devices 690 may use one or more community charging stations that are capable of charging multiple robotic devices 690. The community charging station may be configured to charge multiple robotic devices 690 in parallel. The community charging station may be configured to charge multiple robotic devices 690 in serial such that the multiple robotic devices 690 take turns charging and, when fully charged, return to a predefined home base or reference location in the home that is not associated with a charger. The number of community charging stations may be less than the number of robotic devices 690.

In addition, the charging stations may not be assigned to specific robotic devices 690 and may be capable of charging any of the robotic devices 690. In this regard, the robotic devices 690 may use any suitable, unoccupied charging station when not in use. For instance, when one of the robotic devices 690 has completed an operation or is in need of battery charge, the control unit 610 references a stored table of the occupancy status of each charging station and instructs the robotic device to navigate to the nearest charging station that is unoccupied.

The system 600 further includes one or more integrated security devices 680. The one or more integrated security devices may include any type of device used to provide alerts based on received sensor data. For instance, the one or more control units 610 may provide one or more alerts to the one or more integrated security input/output devices 680. Additionally, the one or more control units 610 may receive one or more sensor data from the sensors 620 and determine whether to provide an alert to the one or more integrated security input/output devices 680.

The sensors 620, the home automation controls 622, the camera 630, the thermostat 634, and the integrated security devices 680 may communicate with the controller 612 over communication links 624, 626, 628, 632, 638, and 684. The communication links 624, 626, 628, 632, 638, and 684 may be a wired or wireless data pathway configured to transmit signals from the sensors 620, the home automation controls 622, the camera 630, the thermostat 634, and the integrated security devices 680 to the controller 612. The sensors 620, the home automation controls 622, the camera 630, the thermostat 634, and the integrated security devices 680 may continuously transmit sensed values to the controller 612, periodically transmit sensed values to the controller 612, or transmit sensed values to the controller 612 in response to a change in a sensed value.

The communication links 624, 626, 628, 632, 638, and 684 may include a local network. The sensors 620, the home automation controls 622, the camera 630, the thermostat 634, and the integrated security devices 680, and the controller 612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 660 is an electronic device configured to provide monitoring services by exchanging electronic communications with the control unit 610, the one or more user devices 640 and 650, and the central alarm station server 670 over the network 605. For example, the monitoring server 660 may be configured to monitor events generated by the control unit 610. In this example, the monitoring server 660 may exchange electronic communications with the network module 614 included in the control unit 610 to receive information regarding events detected by the control unit 610. The monitoring server 660 also may receive information regarding events from the one or more user devices 640 and 650.

In some examples, the monitoring server 660 may route alert data received from the network module 614 or the one or more user devices 640 and 650 to the central alarm station server 670. For example, the monitoring server 660 may transmit the alert data to the central alarm station server 670 over the network 605.

The monitoring server 660 may store sensor and image data received from the monitoring system and perform analysis of sensor and image data received from the monitoring system. Based on the analysis, the monitoring server 660 may communicate with and control aspects of the control unit 610 or the one or more user devices 640 and 650.

The monitoring server 660 may provide various monitoring services to the system 600. For example, the monitoring server 660 may analyze the sensor, image, and other data to determine an activity pattern of a resident of the home monitored by the system 600. In some implementations, the monitoring server 660 may analyze the data for alarm conditions or may determine and perform actions at the home by issuing commands to one or more of the controls 622, possibly through the control unit 610.

The monitoring server 660 can be configured to provide information (e.g., activity patterns) related to one or more residents of the home monitored by the system 600. For example, one or more of the sensors 620, the home automation controls 622, the camera 630, the thermostat 634, and the integrated security devices 680 can collect data related to a resident including location information (e.g., if the resident is home or is not home) and provide location information to the thermostat 634.

The central alarm station server 670 is an electronic device configured to provide alarm monitoring service by exchanging communications with the control unit 610, the one or more user devices 640 and 650, and the monitoring server 660 over the network 605. For example, the central alarm station server 670 may be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more user devices 640 and 650 and/or the monitoring server 660.

The central alarm station server 670 is connected to multiple terminals 672 and 674. The terminals 672 and 674 may be used by operators to process alerting events. For example, the central alarm station server 670 may route alerting data to the terminals 672 and 674 to enable an operator to process the alerting data. The terminals 672 and 674 may include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a sensor 620 detected motion from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more authorized user devices 640 and 650 are devices that host and display user interfaces. For instance, the user device 640 is a mobile device that hosts or runs one or more native applications (e.g., the home monitoring application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a home monitoring application 652. The home monitoring application 642 refers to a software/firmware program running on the corresponding mobile device that enables the user interface and features described throughout. The user device 640 may load or install the home monitoring application 642 based on data received over a network or data received from local media. The home monitoring application 642 runs on mobile devices platforms, such as iPhone, iPod touch, Blackberry, Google Android, Windows Mobile, etc. The home monitoring application 642 enables the user device 640 to receive and process image and sensor data from the monitoring system.

The user device 640 may be a general-purpose computer (e.g., a desktop personal computer, a workstation, or a laptop computer) that is configured to communicate with the monitoring server 660 and/or the control unit 610 over the network 605. The user device 640 may be configured to display a smart home user interface 652 that is generated by the user device 640 or generated by the monitoring server 660. For example, the user device 640 may be configured to display a user interface (e.g., a web page) provided by the monitoring server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit 610 using the communication link 638. For instance, the one or more user devices 640 and 650 may communicate with the control unit 610 using various local wireless protocols such as Wi-Fi, Bluetooth, Z-wave, Zigbee, HomePlug (ethernet over power line), or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring server 660) may be significantly slower.

Although the one or more user devices 640 and 650 are shown as communicating with the control unit 610, the one or more user devices 640 and 650 may communicate directly with the sensors and other devices controlled by the control unit 610. In some implementations, the one or more user devices 640 and 650 replace the control unit 610 and perform the functions of the control unit 610 for local monitoring and long range/offsite communication.

In other implementations, the one or more user devices 640 and 650 receive monitoring system data captured by the control unit 610 through the network 605. The one or more user devices 640, 650 may receive the data from the control unit 610 through the network 605 or the monitoring server 660 may relay data received from the control unit 610 to the one or more user devices 640 and 650 through the network 605. In this regard, the monitoring server 660 may facilitate communication between the one or more user devices 640 and 650 and the monitoring system.

In some implementations, the one or more user devices 640 and 650 may be configured to switch whether the one or more user devices 640 and 650 communicate with the control unit 610 directly (e.g., through link 638) or through the monitoring server 660 (e.g., through network 605) based on a location of the one or more user devices 640 and 650. For instance, when the one or more user devices 640 and 650 are located close to the control unit 610 and in range to communicate directly with the control unit 610, the one or more user devices 640 and 650 use direct communication. When the one or more user devices 640 and 650 are located far from the control unit 610 and not in range to communicate directly with the control unit 610, the one or more user devices 640 and 650 use communication through the monitoring server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 includes the one or more user devices 640 and 650, the sensors 620, the home automation controls 622, the camera 630, and the robotic devices 690. The one or more user devices 640 and 650 receive data directly from the sensors 620, the home automation controls 622, the camera 630, and the robotic devices 690, and sends data directly to the sensors 620, the home automation controls 622, the camera 630, and the robotic devices 690. The one or more user devices 640, 650 provide the appropriate interfaces/processing to provide visual surveillance and reporting.

In other implementations, the system 600 further includes network 605 and the sensors 620, the home automation controls 622, the camera 630, the thermostat 634, and the robotic devices 690, and are configured to communicate sensor and image data to the one or more user devices 640 and 650 over network 605 (e.g., the Internet, cellular network, etc.). In yet another implementation, the sensors 620, the home automation controls 622, the camera 630, the thermostat 634, and the robotic devices 690 (or a component, such as a bridge/router) are intelligent enough to change the communication pathway from a direct local pathway when the one or more user devices 640 and 650 are in close physical proximity to the sensors 620, the home automation controls 622, the camera 630, the thermostat 634, and the robotic devices 690 to a pathway over network 605 when the one or more user devices 640 and 650 are farther from the sensors 620, the home automation controls 622, the camera 630, the thermostat 634, and the robotic devices 690.

In some examples, the system leverages GPS information from the one or more user devices 640 and 650 to determine whether the one or more user devices 640 and 650 are close enough to the sensors 620, the home automation controls 622, the camera 630, the thermostat 634, and the robotic devices 690 to use the direct local pathway or whether the one or more user devices 640 and 650 are far enough from the sensors 620, the home automation controls 622, the camera 630, the thermostat 634, and the robotic devices 690 that the pathway over network 605 is required.

In other examples, the system leverages status communications (e.g., pinging) between the one or more user devices 640 and 650 and the sensors 620, the home automation controls 622, the camera 630, the thermostat 634, and the robotic devices 690 to determine whether communication using the direct local pathway is possible. If communication using the direct local pathway is possible, the one or more user devices 640 and 650 communicate with the sensors 620, the home automation controls 622, the camera 630, the thermostat 634, and the robotic devices 690 using the direct local pathway. If communication using the direct local pathway is not possible, the one or more user devices 640 and 650 communicate with the sensors 620, the home automation controls 622, the camera 630, the thermostat 634, and the robotic devices 690 using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "away" state, but set not to capture images when the alarm system is armed in a "home" state or disarmed. In addition, the camera 630 may be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
accessing a plurality of recorded videos i) captured by a camera and ii) of an area in a field of view of the camera;
accessing, for at least one of the plurality of recorded videos, data indicative of whether an event of interest was detected in the respective recorded video;
identifying, from the plurality of recorded videos, a recorded video for an evaluation of an event;
identifying a particular time in the recorded video when an event of interest does not match a ground truth determination for the recorded video using the data indicative of whether any of a plurality of events of interest were detected in the respective recorded video;
obtaining a first video analysis evaluation of the event of interest in the recorded video at the particular time;
obtaining a second video analysis evaluation of the event of interest in the recorded video at the particular time;
determining whether the second video analysis evaluation on the recorded video satisfies a similarity criterion with the first video analysis evaluation on the recorded video;
displaying an image from the particular time in the recorded video;
displaying an indication whether the second video analysis evaluation on the recorded video satisfies the similarity criterion with the first video analysis evaluation on the recorded video;
in response to determining whether the second video analysis evaluation on the recorded video satisfies the similarity criterion with the first video analysis evaluation on the recorded video, determining parameters for at least one of the first video analysis, the second video analysis, or an event detection process according to (i) the indication and (ii) one or more conditions of the area in the field of view of the camera; and
applying the parameters to at least one of the first video analysis, the second video analysis, or the event detection process for a subsequent video.

2. The method of claim 1, wherein displaying the image from the particular time in the recorded video comprises generating a graphical user interface for presentation on a display of a computing device.

3. The method of claim 1, wherein displaying the indication whether the second video analysis evaluation on the recorded video satisfies the similarity criterion with the first video analysis evaluation on the recorded video comprises displaying a depiction of a virtual line crossing.

4. The method of claim 1, wherein displaying the indication whether the second video analysis evaluation on the recorded video satisfies the similarity criterion with the first video analysis evaluation on the recorded video comprises displaying a depiction of a bounding box.

5. The method of claim 4, wherein the bounding box is positioned around a region of the image where the evaluation of the event or the ground truth determination detected an object.

6. The method of claim 4, wherein the bounding box is positioned around a region of the image where the evaluation of the event or the ground truth determination detected motion.

7. The method of claim 1, wherein displaying the indication whether the second video analysis evaluation on the recorded video satisfies the similarity criterion with the first video analysis evaluation on the recorded video comprises displaying a depiction of boundaries around a portion of the image that corresponds to an area of interest.

8. The method of claim 7, wherein the area of interest comprises an area of a property that is monitored by the camera that captured the recorded video.

9. The method of claim 1, wherein displaying the indication whether the second video analysis evaluation on the recorded video satisfies the similarity criterion with the first video analysis evaluation on the recorded video comprises displaying text indicating that the event of interest does not match the ground truth determination for the recorded video.

10. The method of claim 1, wherein the indication whether the second video analysis evaluation on the recorded video satisfies the similarity criterion with the first video analysis evaluation on the recorded video includes a user-selectable icon.

11. The method of claim 10, the method comprising:
in response to a user selecting the user-selectable icon, displaying video analysis results for the particular time in the recorded video.

12. The method of claim 1, wherein identifying the particular time in the recorded video when the analysis determination event of interest does not match the ground truth determination for the recorded video using the data indicative of whether any of the plurality of events of interest were detected in the respective recorded video comprises identifying the particular time in the recorded video when one or more of a false positive motion detection event, a false negative motion detection event, a false positive object detection event, a false negative object detection event, or a false object classification event occurred.

13. The method of claim 1, wherein identifying the particular time in the recorded video when the event of interest does not match the ground truth determination for the recorded video using the data indicative of whether any of the plurality of events of interest were detected in the respective recorded video comprises identifying the particular time in the recorded video when a motion detection latency occurred.

14. The method of claim 13, wherein the motion detection latency comprises motion detection at a time in the recorded video that is greater than a threshold time duration after ground truth motion detection.

15. The method of claim 1, wherein identifying the particular time in the recorded video when the event of interest does not match the ground truth determination for the recorded video using the data indicative of whether any of the plurality of events of interest were detected in the respective recorded video comprises identifying the particular time in the recorded video when an object detection latency occurred.

16. The method of claim 15, wherein the object detection latency comprises object detection at a time in the recorded video that is greater than a threshold time duration after ground truth object detection.

17. The method of claim 1, wherein identifying the recorded video for the evaluation of the event comprises selecting a video clip from a database of stored video clips.

18. A system comprising:
one or more processors and one or more computer storage media storing instructions that are operable, when executed by the one or more processors, to cause the one or more processors to perform operations comprising:
accessing a plurality of recorded videos i) captured by a camera and ii) of an area in a field of view of the camera;
accessing, for at least one of the plurality of recorded videos, data indicative of whether an event of interest was detected in the respective recorded video;
identifying, from the plurality of recorded videos, a recorded video for an evaluation of an event;
identifying a particular time in the recorded video when an event of interest does not match a ground truth determination for the recorded video using the data indicative of whether any of a plurality of events of interest were detected in the respective recorded video;
obtaining a first video analysis evaluation of the event of interest in the recorded video at the particular time;
obtaining a second video analysis evaluation of the event of interest in the recorded video at the particular time;
determining whether the second video analysis evaluation on the recorded video satisfies a similarity criterion with the first video analysis evaluation on the recorded video;
displaying an image from the particular time in the recorded video;
displaying an indication whether the second video analysis evaluation on the recorded video satisfies a similarity criterion with the first video analysis evaluation on the recorded video;
in response to determining whether the second video analysis evaluation on the recorded video satisfies a similarity criterion with the first video analysis evaluation on the recorded video, determining parameters for at least one of the first video analysis, the second video analysis, or an event detection process according to (i) the indication and (ii) one or more conditions of the area in the field of view of the camera; and
applying the parameters to at least one of the first video analysis, the second video analysis, or the event detection process for a subsequent video.

19. A non-transitory computer-readable medium storing software comprising instructions executable by one or more computers which, upon such execution, cause the one or more computers to perform operations comprising:
accessing a plurality of recorded videos i) captured by a camera and ii) of an area in a field of view of the camera;

accessing, for at least one of the plurality of recorded videos, data indicative of whether an event of interest was detected in the respective recorded video;

identifying, from the plurality of recorded videos, a recorded video for to an evaluation of an event;

identifying a particular time in the recorded video when an event of interest does not match a ground truth determination for the recorded video using the data indicative of whether any of a plurality of events of interest were detected in the respective recorded video;

obtaining a first video analysis evaluation of the event of interest in the recorded video at the particular time;

obtaining a second video analysis evaluation of the event of interest in the recorded video at the particular time;

determining whether the second video analysis evaluation on the recorded video satisfies a similarity criterion with the first video analysis evaluation on the recorded video;

displaying an image from the particular time in the recorded video;

displaying an indication whether the second video analysis evaluation on the recorded video satisfies a similarity criterion with the first video analysis evaluation on the recorded video;

in response to determining whether the second video analysis evaluation on the recorded video satisfies a similarity criterion with the first video analysis evaluation on the recorded video, determining parameters for at least one of the first video analysis, the second video analysis, or an event detection process according to (i) the indication and (ii) one or more conditions of the area in the field of view of the camera; and applying the parameters to at least one of the first video analysis, the second video analysis, or the event detection process for a subsequent video.

* * * * *

UNITED STATES PATENT AND TRADEMARK OFFICE
CERTIFICATE OF CORRECTION

| | |
|---|---|
| PATENT NO. | : 11,823,452 B2 |
| APPLICATION NO. | : 17/153486 |
| DATED | : November 21, 2023 |
| INVENTOR(S) | : Ethan Shayne et al. |

It is certified that error appears in the above-identified patent and that said Letters Patent is hereby corrected as shown below:

In the Claims

In Claim 19, Column 31, Line 5 (approx.), after "video for" delete "to".

Signed and Sealed this
Thirteenth Day of February, 2024

Katherine Kelly Vidal
*Director of the United States Patent and Trademark Office*